(12) United States Patent
Witte et al.

(10) Patent No.: US 10,619,734 B2
(45) Date of Patent: Apr. 14, 2020

(54) HYDROSTATIC TRANSMISSION AND METHOD FOR BRAKING USING THE SAME

(71) Applicant: Robert Bosch GmbH, Stuttgart (DE)

(72) Inventors: Heiko Witte, Ulm (DE); Martin Behm, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 88 days.

(21) Appl. No.: 15/894,777

(22) Filed: Feb. 12, 2018

(65) Prior Publication Data
US 2018/0231120 A1 Aug. 16, 2018

(30) Foreign Application Priority Data

Feb. 14, 2017 (DE) ........................ 10 2017 202 281

(51) Int. Cl.
| | | |
|---|---|---|
| *F16H 61/4157* | (2010.01) | |
| *F16H 39/10* | (2006.01) | |
| *F16H 61/4017* | (2010.01) | |
| *F16H 61/425* | (2010.01) | |
| *F16H 61/435* | (2010.01) | |
| *F16H 61/46* | (2010.01) | |

(52) U.S. Cl.
CPC ......... *F16H 61/4157* (2013.01); *F16H 39/10* (2013.01); *F16H 61/4017* (2013.01); *F16H 61/425* (2013.01); *F16H 61/435* (2013.01); *F16H 61/46* (2013.01)

(58) Field of Classification Search
CPC ... F16H 61/435; F16H 61/425; F16H 61/4157
See application file for complete search history.

(56) References Cited

U.S. PATENT DOCUMENTS

| | | | | |
|---|---|---|---|---|
| 4,215,545 A | * | 8/1980 | Morello | B60K 6/12 60/413 |
| 5,390,759 A | * | 2/1995 | Gollner | F16H 61/421 180/307 |
| 7,874,153 B2 | * | 1/2011 | Behm | B60W 10/196 60/464 |
| 8,316,983 B2 | * | 11/2012 | Shirao | B60W 10/06 180/305 |
| 8,356,479 B2 | * | 1/2013 | Essig | F16H 61/4017 60/468 |
| 8,683,794 B2 | * | 4/2014 | Fukuda | F16H 61/4008 60/431 |
| 9,676,600 B2 | * | 6/2017 | Kaneko | B66F 9/22 |
| 10,071,719 B2 | * | 9/2018 | Behm | B60T 1/08 |

(Continued)

FOREIGN PATENT DOCUMENTS

| | | |
|---|---|---|
| DE | 10 2014 211 393 A1 | 12/2014 |
| DE | 10 2014 206 123 A1 | 10/2015 |

*Primary Examiner* — Thomas E Lazo
(74) *Attorney, Agent, or Firm* — Maginot, Moore & Beck LLP

(57) ABSTRACT

A hydrostatic transmission for a traction drive includes a variable-displacement pump and one or more motors coupled to one another in a closed hydraulic circuit. A braking operation is introduced into the traction drive via the hydrostatic transmission, and is controlled in closed-loop fashion by an electronic control unit. A braking torque is controlled in closed-loop fashion indirectly by a swept volume of the secondary unit, for which purpose one or two closed-loop controllers are provided.

14 Claims, 1 Drawing Sheet

(56) References Cited

U.S. PATENT DOCUMENTS

| | | | | |
|---|---|---|---|---|
| 2008/0184703 | A1* | 8/2008 | Gerth | F16H 61/425 |
| | | | | 60/426 |
| 2008/0262688 | A1* | 10/2008 | Behm | B60T 8/1766 |
| | | | | 701/70 |
| 2011/0308878 | A1* | 12/2011 | Shirao | B60W 10/06 |
| | | | | 180/305 |
| 2014/0075930 | A1* | 3/2014 | Maiyur | F04B 13/00 |
| | | | | 60/327 |
| 2014/0372000 | A1* | 12/2014 | Rozycki | F16H 61/421 |
| | | | | 701/58 |
| 2015/0274149 | A1* | 10/2015 | Behm | B60T 1/08 |
| | | | | 60/327 |

* cited by examiner

HYDROSTATIC TRANSMISSION AND METHOD FOR BRAKING USING THE SAME

This application claims priority under 35 U.S.C. § 119 to patent application no. DE 10 2017 202 281.7, filed on Feb. 14, 2017 in Germany, the disclosure of which is incorporated herein by reference in its entirety.

The disclosure relates to a hydrostatic transmission with which a braking operation is possible, and to a method for the braking of a vehicle which has a traction drive with a hydrostatic transmission.

BACKGROUND

The prior art has disclosed hydrostatic transmissions for mobile working machines in which a hydrostatic pump (primary unit) and at least one hydrostatic motor (secondary unit) are fluidically connected to one another by means of a closed hydraulic circuit. A primary unit may be situated with multiple secondary units in a closed hydraulic circuit, wherein the secondary units are normally arranged in parallel with respect to one another in terms of the circuit configuration. An internal combustion engine, for example a diesel engine of the mobile working machine, is coupled rotationally conjointly to the primary unit, and an output, for example an axle or a wheel of the mobile working machine, is coupled rotationally conjointly to the secondary unit. The mobile working machine thus has a traction drive which has a hydrostatic transmission.

The mobile working machine can also be braked using such hydrostatic transmissions. Here, in relation to traction operation, the power flows in the reverse direction from the output, via the secondary unit acting as a pump and via the primary unit acting as a motor, to the internal combustion engine, which is then driven in a passive cranking operating mode.

From the applicant, hydrostatic transmissions are known which have a speed control system with a two-position closed-loop controller. If the actual traveling speed of the mobile working machine in question reaches a fixed activation threshold—in particular a maximum admissible traveling speed—a high-power braking operation is initiated and is performed until the actual traveling speed falls below a fixed deactivation threshold. This is a discontinuous speed control system, and braking is performed with a fixed braking torque.

The documents DE 10 2014 211 393 A1 and US 2014/0372000 A1 each disclose a hydrostatic transmission with a speed control system which identifies an overshooting of the braking power of the internal combustion engine and thereupon automatically triggers a high-power braking operation. A part of the braking power is output to the internal combustion engine, whereas another part of the braking power is converted by means of a pressure-limiting valve of the high-pressure line in question into heat. It is disclosed in a non-specific manner that the delivery volume of the secondary unit is implemented from the braking demand.

DE 10 2014 206 123 A1 has disclosed a method for identifying overrun operation and for calculating the braking torque on the basis of the overrun operation. Here, a difference between the setpoint and the actual traveling speed of the mobile working machine in question is taken into consideration, and is converted, by multiplication by a constant, into a braking torque which can be controlled by a control unit by means of the adjustment devices and thus by means of the swept volumes of the two units.

SUMMARY

The disclosure is based on the object of providing a hydrostatic transmission which is capable of braking, wherein the adaptation of the braking torque to different operating states, input situations and braking processes is improved.

Said object is achieved by means of a hydrostatic transmission having the features disclosed herein and by means of a method having the features disclosed herein.

The claimed hydrostatic transmission is provided for a traction drive which has an internal combustion engine, for example a diesel engine, and an output, for example an axle or a wheel. The hydrostatic transmission has a primary unit, which is couplable to the internal combustion engine of the traction drive and which operates as a pump during traction operation, and at least one secondary unit, which is couplable to an output of the traction drive and which operates as a motor during traction operation. A primary unit may be assigned one or more secondary units, for example four secondary units on two axles and four wheels in the case of a field sprayer, or one secondary unit in the case of a forklift truck. The primary unit and the secondary unit(s) are fluidically connected to one another by means of two working lines of a closed hydraulic circuit. Furthermore, the units have an adjustable pivot angle and thus an adjustable swept volume which are controllable by an electrical control unit during a braking operation of the hydrostatic transmission. According to the disclosure, the transmission—preferably the control unit—has a P closed-loop controller, the input variable of which is a difference between a setpoint traveling speed and an actual traveling speed of the mobile working machine in question or a difference, proportional to the former, between a setpoint rotational speed and an actual rotational speed of the secondary unit. By means of the P closed-loop controller according to the disclosure, a required total braking torque is determined in accordance with demand, wherein the adaptation of the braking torque to different operating states, input situations and braking processes is improved. Here, at all times, braking torque is provided only to the extent that is actually required. Intermittent braking is prevented, and continuous braking is made possible. During overrun operation, for example when traveling downhill, the required braking torque is exactly maintained.

If the setpoint traveling speed or the setpoint rotational speed proportional to the former is adjustable by means of an operating element, for example by means of a brake pedal or an accelerator pedal or an accelerator lever or else by means of an automatic speed controller, the required total braking torque can be determined from the driver demand. More specifically, the braking torque is derived from the actuation position of the operating element.

If the P closed-loop controller according to the disclosure is a PI closed-loop controller, the closed-loop control deviation can be correctly compensated and kept stable by means of the integrator component. Thus, for example when traveling downhill, the setpoint traveling speed can be exactly maintained.

If the P closed-loop controller according to the disclosure is a PID closed-loop controller, the dynamics can be increased.

An output variable of the P closed-loop controller is preferably an additional braking torque or a value, proportional to the former, of the secondary unit.

By means of the operating element, a response behavior of the braking operation can also be derived from the driver demand. A response behavior is to be understood to mean an interaction between, on the one hand, the braking torque controlled in closed-loop fashion according to the disclosure and, on the other hand, a rate of response or an increase. Accordingly, firstly, the braking torque can be derived from an actuation position of the operating element and, secondly, the rate of response or the increase of the required total braking torque, or of the value proportional to the former, can be derived from a rate of actuation or change of the operating element. For this purpose, a differentiating closed-loop controller (D closed-loop controller) is provided, preferably in the control unit, the input variable of which is the setpoint traveling speed or the setpoint rotational speed, proportional to the former, of the secondary unit.

If an output variable of the D closed-loop controller is also an additional braking torque or a value, proportional to the former, of the secondary unit, then the output variable of the additional D closed-loop controller can be added, as an additional braking demand, to the output variable of the P closed-loop controller according to the disclosure. An advantage of this refinement is that said additional braking torque acts only directly upon the initiation of the braking action, and therefore also influences only the response behavior.

To permit a high-power braking operation with the transmission according to the disclosure, it is particularly preferable if in each case one pressure-limiting valve is arranged on both working lines. A first part of the braking power can be dissipated via the pressure-limiting valve involved in the braking operation, whereas a second part of the braking power can be dissipated via the primary unit and via the internal combustion engine. The braking power that can be realized is particularly high if the first part is greater than the second part.

If, during the high-power braking operation, the volume flow via the primary unit increases, the volume flow via the related pressure-limiting valve decreases. Thus, the pressure in the working line at high pressure can fall. To minimize this pressure reduction or to keep the pressure approximately constant, pressure-limiting valves are preferred which, have a flat characteristic curve with regard to their pressure difference as a function of their passed-through volume flow.

For the secondary unit, the following basically applies:

$$M\_mot = Vg\_mot * \Delta p / 2 * \pi;$$

where $\Delta p$ is a pressure difference of the two working lines.

In the case of the flat characteristic curve of the pressure-limiting valves, the following applies:

$$\Delta p \approx const. \text{ and thus } M\_mot \approx f(Vg\_mot).$$

Then, in general terms, rather than the stated braking torques, the delivery volumes, approximately proportional to the former, of the secondary unit can be controlled in closed-loop fashion for example by means of the pivot angle of said secondary unit.

It is alternatively likewise possible to control not the stated braking torques but the delivery volumes, which are approximately proportional to the former, of the secondary unit in closed-loop fashion with sufficient accuracy if the fluctuations in the pressure difference $\Delta p$ of the two working lines are not large.

In particular, it is thus possible for the initial values of the two closed-loop controllers to be the additional delivery volumes, which are proportional to the respective additional braking torque, of the secondary unit.

The additional delivery volumes are preferably added to a minimum delivery volume of the secondary unit, whereby the required total delivery volume, which is proportional to the required total braking power, of the secondary unit is realized during the (high-power) braking operation. The minimum delivery volume acts immediately upon the initiation of the braking operation even without a closed-loop control deviation, and thus also influences only the response behavior. The minimum delivery volume is set in a manner dependent on the mobile working machine involved and/or in a manner dependent on the customer demand.

In a preferred refinement of the hydrostatic transmission according to the disclosure, the pivot angle and thus the swept volume of the primary unit are adjustable in both directions from a central position or from a zero position. The traction drive in question can thus, with a constant direction of rotation of the internal combustion engine, be utilized in traction operation in both directions of travel of the mobile working machine, and can correspondingly be braked (with high-power action) according to the disclosure in both directions.

The method according to the disclosure serves for the closed-loop control of the required total braking torque or the required total delivery volume, proportional to the former, of the above-described hydrostatic transmission, and has the following steps:

calculating the first additional delivery volume by means of the P closed-loop controller on the basis of the traveling speed difference between the setpoint traveling speed and the actual traveling speed of the mobile working machine in question or on the basis of the difference, proportional to the former, between the setpoint rotational speed and the actual rotational speed of the secondary unit, and adding the first additional delivery volume to the minimum delivery volume to give the required total delivery volume of the secondary unit, and setting the swept volume of the secondary unit to said required total delivery volume.

In a refinement of the method according to the disclosure, the second additional delivery volume is calculated by means of the D closed-loop controller on the basis of the setpoint traveling speed or the setpoint rotational speed proportional to the former. Then, in the abovementioned adding step, the second additional delivery volume is also added to the minimum delivery volume of the secondary unit.

The values stated in this document and the values proportional to the former may arise for example in the case of values when these are "rotationally conjointly coupled to one another" by means of a mechanical transmission. For example, it is possible for the actual traveling speed to be derived from the actual rotational speed of the secondary unit or vice versa.

Use may however also be made of a signal of the traveling speed which is provided by a (further central) control unit of the mobile working machine.

The stated values and the values proportional to the former may also be equal. This arises for example if a rotational speed value and the rotational speed value referred to as proportional are coupled to one another by means of a unipartite shaft. For example, it is possible for the rotational speed value of the crankshaft of the internal combustion engine (which does not belong to the claimed transmission) to be read directly from the rotational speed value of the driveshaft, coupled thereto, of the primary unit (of the claimed transmission). This relationship can be utilized if it is also sought to realize overspeed protection of the internal combustion engine with the transmission according to the disclosure.

Said overspeed protection may be configured such that a first activation threshold, or a first activation threshold derived therefrom, lies above a setpoint rotational speed of the internal combustion engine by an added-on value, and such that a further activation threshold is provided, wherein the braking operation can be automatically initiated by means of the control unit if an actual rotational speed of the internal combustion engine reaches or exceeds the first activation threshold, and if the further activation threshold is also reached or exceeded by a further actual value.

Furthermore, it may also be possible for a braking operation to be automatically initiated by means of the control unit if an actual traveling speed of the mobile working machine reaches an activation threshold of the traveling speed, wherein the activation threshold is variable or adjustable.

An exemplary embodiment of the transmission according to the disclosure is illustrated in the drawings. The disclosure will now be discussed in more detail on the basis of the figures of said drawings.

DETAILED DESCRIPTION

Figure 1:
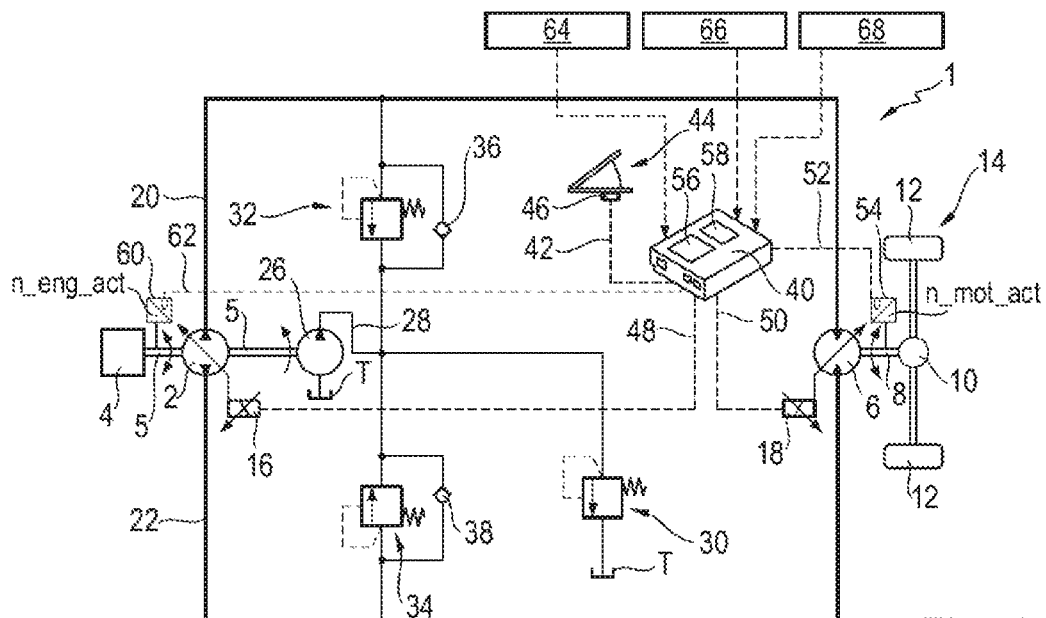
FIG. 1 shows a hydraulic and electrical schematic diagram of a traction drive having a hydrostatic transmission according to the disclosure as per the exemplary embodiment.

According to FIG. 1, a hydrostatic traction drive of a mobile working machine (not shown in any more detail) (for example wheeled loader, telehandler, combine harvester or field harvester) has a hydrostatic transmission 1 according to the disclosure. The transmission 1 has a hydrostatic primary unit 2 which is operated primarily as a hydraulic pump and which is driven by an internal combustion engine 4, designed as a diesel engine, of the traction drive via a driveshaft 5. Furthermore, the transmission 1 has a hydrostatic secondary unit 6, which is coupled via a driveshaft 8 to an axle 14, which has two wheels 12, of the traction drive and which is operated primarily as a hydraulic motor. More specifically, the driveshaft 8 is coupled to a differential transmission 10 of the axle 14.

Both units 2, 6 are adjustable in terms of their swept volume Vg_pump, Vg_mot by means of a respective adjustment device 16, 18. The primary unit 2 is fluidically connected to the secondary unit 6 via a closed circuit. More specifically, the units 2, 6 are connected to one another via a first working line 20, which in the further explanations is the feed line and via which pressure medium flows from the primary unit 2 to the secondary unit 6, and via a second working line 22, which in the further explanations is the return line and via which pressure medium flows from the secondary unit 6 to the primary unit 2.

The hydrostatic transmission 1 has a feed pump 26 which is connected to the driveshaft 5 of the primary unit 2 and which can deliver pressure medium from a tank T into a feed line 28. The latter branches into three branches, wherein a first branch can be relieved of pressure via a pressure-limiting valve 30 into a tank T. A second and a third branch can be connected in pressure-medium-conducting fashion via a respective pressure-limiting valve 32, 34, of which each has an integrated replenishment check valve 36, 38, to the branch line 20 and to the branch line 22 respectively.

Both units 2, 6 are operable in all four quadrants, such that both the flow direction of the pressure medium in the closed hydraulic circuit and the direction of rotation of each of the units 2, 6 is reversible.

The hydrostatic transmission 1 has a control unit 40, to which a brake pedal 44 is connected via a signal line 42. The brake pedal 44 has a sensor 46 by means of which an actuation intensity and a rate of actuation of the brake pedal 44 can be detected and transmitted via the signal line 42 to the control unit 40. The latter is furthermore connected via an electrical signal line 48 to the adjustment device 16 of the primary unit 2 and via an electrical signal line 50 to the adjustment device 18 of the secondary unit 6.

Via an electrical signal line 52, a rotational speed detection unit 54 by means of which an actual rotational speed n_mot_act of the secondary unit 6 can be detected at the driveshaft 8 is connected to the control unit 40. From this, the actual traveling speed v_veh_act, proportional to said actual rotational speed, of the mobile working machine in question is calculated by the control unit 40.

Via an electrical signal line 62, a rotational speed detection unit 60 by means of which an actual rotational speed n_pump_act of the primary unit 2 can be detected at its driveshaft 5 is connected to the control unit 40. Owing to the fact that the driveshaft 5 is formed in one piece with a crankshaft of the internal combustion engine 4, an actual rotational speed n_eng_act of the internal combustion engine 4, which is to be limited, is also detected by means of the rotational speed detection unit 60.

Use may also be made of a rotational speed signal which is provided by the internal combustion engine as a CAN bus signal. A sensor is likewise required for this purpose. Said sensor is however then read in by an engine control unit and provided via a CAN bus.

As further operating elements that serve for transmitting a driver demand, an automatic speed controller 64, an accelerator pedal 66 and an accelerator lever 68 are electrically connected via respective signal lines to the control unit 40. The accelerator pedal and accelerator lever may also be provided alternatively.

During the operation of the hydrostatic transmission 1 according to the disclosure, the control unit 40 calculates a setpoint rotational speed n_mot_des of the driveshaft 8 of the secondary unit 2 from the setting of the automatic speed controller 64 or the position of the accelerator pedal 66 or of the accelerator lever 68, because said setpoint rotational speed is proportional to the setpoint traveling speed v_veh_des of the mobile working machine in question. Correspondingly, the actual traveling speed v_veh_act is inferred from the actual rotational speed n_mot_act of the secondary unit 6.

During the high-power braking operation by means of the hydrostatic transmission 1 according to the disclosure, the axle 14 is supported, via the driveshaft 8 and via the secondary unit 6 operating as a pump and via one of the two working lines 22 and via the primary unit 2 operating as a motor and via the driveshaft 5 of the primary unit 2, on the internal combustion engine 4, which is then cranked and, by means of its friction and acceleration forces of the pistons, dissipates at least a part of the braking energy of the mobile working machine.

The control unit 40 has a memory unit 56 and a processor unit 58 in which the closed-loop control according to the disclosure of the required total braking torque M_mot_des is performed.

The two pressure-limiting valves 32, 34 are configured such that the pressure difference between their working-line-side input and their output is only insignificantly dependent on the discharged volume flow, whereby the two pressure-limiting valves 32, 34 have a flat characteristic curve. Thus, the pressure difference between the two working lines 20, 22 is dependent substantially on the respective responding pressure-limiting valve 32, 34 of the high-pressure-conducting working line 20, 22. The basic relationship $$M\_mot = Vg\_mot * \Delta p / 2 * \pi;$$

thus simplifies to $$M\_mot \approx f(Vg\_mot).$$

Therefore, in the processing unit 58, the closed-loop control according to the disclosure of the required total braking torque M_mot_des occurs indirectly by means of the regulation of the required total delivery volume Vg_mot_ des of the secondary unit 6, which during braking operation is a delivery volume.

Figure 2:
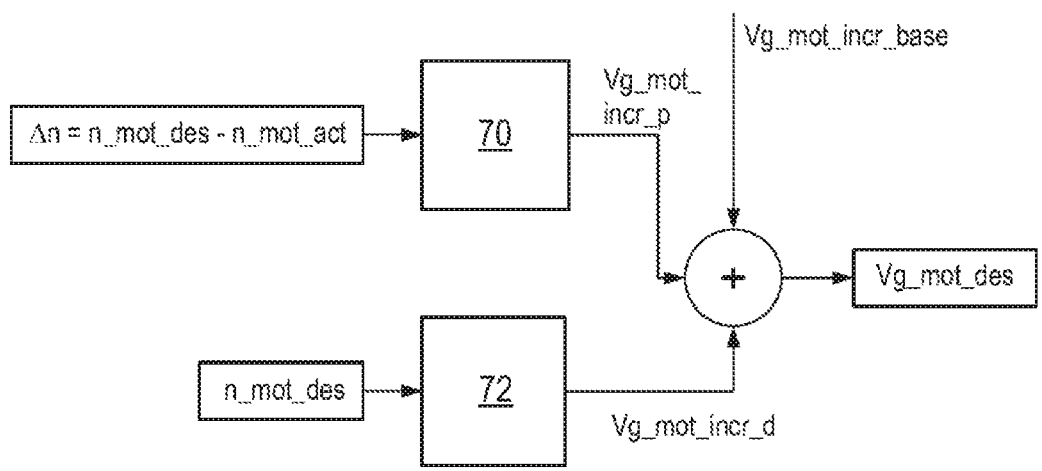
FIG. 2 shows a diagram for the determination of the required total delivery volume for the secondary unit of the transmission from FIG. 1 during the braking operation.

FIG. 2 shows the composition of the required total delivery volume Vg_mot_des of the secondary unit 6. From the rotational speed difference Δn between the setpoint rotational speed n_mot_des and the actual rotational speed n_mot_act of the secondary unit 6, a first additional delivery volume Vg_mot_incr_p is determined by means of a P closed-loop controller 70, which is refined as a PI closed-loop controller. Furthermore, a second additional delivery volume Vg_mot_incr_p is determined from the setpoint rotational speed n_mot_des of the secondary unit 6 by means of a D closed-loop controller 72. Said second additional delivery volume is thus dependent on the movement speed of, in particular, the brake pedal 44. Said two delivery volumes Vg_mot_incr_d, Vg_mot_incr_p are added to a minimum delivery volume Vg_mot_incr_base to give the required total delivery volume Vg_mot_des of the secondary unit 6.

An overspeed protection facility may be configured such that a first activation threshold (n_eng_on_min) or a first activation threshold (n_pump_on_min) proportional to the former lies above a setpoint rotational speed (n_eng_des) of the internal combustion engine (4), or above a rotational speed (n_pump_des), proportional to the former, of the primary unit (2), by an added-on value. Furthermore, a further activation threshold or a further activation threshold proportional to the former is provided. The braking operation is automatically initiated by means of the control unit (40) if an actual rotational speed (n_eng_act) of the internal combustion engine (4) or a rotational speed (n_pump_act), proportional to the former, of the primary unit (2) reaches or exceeds the first activation threshold (n_eng_on_min), and if the further activation threshold is also reached or exceeded by a further actual value or a value proportional to the former.

Furthermore, a braking operation may also be automatically initiated by means of the control unit (40) if an actual traveling speed (v_veh_act) of the mobile working machine or the actual speed (n_mot_act), proportional to the former, of the secondary unit (6) reaches an activation threshold of the traveling speed (v_veh_on) or an activation threshold, proportional to the former, of the rotational speed (n_mot_on) of the secondary unit (6). The activation threshold (v_veh_on; n_mot_on) is variable or adjustable.

A hydrostatic transmission for a traction drive is disclosed, wherein a variable-displacement pump and one or more motors are coupled to one another in a closed hydraulic circuit. A braking operation can be introduced into the traction drive via the transmission, and controlled in closed-loop fashion, by an electronic control unit. Here, a braking torque is controlled in closed-loop fashion indirectly by means of a swept volume of the secondary unit, for which purpose one or two closed-loop controllers are provided.

LIST OF REFERENCE DESIGNATIONS

1 Hydrostatic transmission
2 Primary unit
4 Internal combustion engine
5 Driveshaft
6 Secondary unit
8 Driveshaft
10 Differential transmission
12 Wheel
14 Output/axle
16 Adjustment device
18 Adjustment device
20 Working line
22 Working line
26 Feed pump
28 Feed line
30 Pressure-limiting valve
32 Pressure-limiting valve
34 Pressure-limiting valve
36 Replenishment check valve
38 Replenishment check valve
40 Control unit
42 Signal line
44 Operating element/brake pedal
46 Sensor
48 Signal line
50 Signal line
52 Signal line
54 Rotational speed detection unit
56 Memory unit
58 Processor unit
60 Rotational speed detection unit
62 Signal line
64 Operating element/automatic speed controller
66 Operating element/accelerator pedal
68 Operating element/accelerator lever
70 P closed-loop controller
72 D closed-loop controller
n_eng_on_min Activation threshold of the internal combustion engine
n_eng_des Setpoint rotational speed of the internal combustion engine
n_eng_act Actual rotational speed of the internal combustion engine
n_mot_on Activation threshold of the secondary unit
n_mot_des Setpoint rotational speed of the secondary unit
n_mot_act Actual rotational speed of the secondary unit
n_pump_des Setpoint rotational speed of the primary unit
n_pump_act Actual rotational speed of the primary unit
n_pump_on_min Activation threshold of the primary unit
Vg_pump Swept volume of the primary unit/suction volume of the primary unit during braking Vg_mot Swept volume of the secondary unit/delivery volume of the secondary unit during braking Vg_mot_incr_base Minimum delivery volume of the secondary unit during braking M_mot_incr_p First additional braking torque of the secondary unit Vg_mot_incr_p First additional delivery volume of the secondary unit during braking M_mot_incr_d Second additional braking torque of the secondary unit Vg_mot_incr_d Second additional delivery volume of the secondary unit during braking M_mot_des Required total braking torque of the secondary unit Vg_mot_des Required total delivery volume of the secondary unit during braking v_veh_act Actual traveling speed v_veh_des Setpoint traveling speed v_veh_on Activation threshold of the traveling speed Δv_veh Traveling speed difference Δn_mot Rotational speed difference of the secondary unit Δp Pressure difference between the two working lines

What is claimed is:

1. A hydrostatic transmission for a traction drive, comprising:
a primary unit coupled to an internal combustion engine of the traction drive;
at least one secondary unit coupled to an output of the traction drive;
two working lines of a closed circuit configured to fluidically connect the primary unit and the at least one secondary unit;
an electrical control unit, wherein each of the primary unit and the at least one secondary unit have an adjustable pivot angle or an adjustable swept volume which are controllable by the electrical control unit during a braking operation of the hydrostatic transmission; and
a P closed-loop controller configured for closed-loop control of a required total braking torque or of a value proportional to the required total braking torque,
wherein an input variable of the P closed-loop controller is (i) a traveling speed difference between a setpoint traveling speed and an actual traveling speed, or (ii) a rotational speed difference, proportional to the traveling speed difference, between a setpoint rotational speed and an actual rotational speed of the at least one secondary unit, and
wherein an output variable of the P closed-loop controller is a first additional braking torque of the at least one secondary unit or a first value, proportional to the first additional braking torque, of the at least one secondary unit.

2. The hydrostatic transmission according to claim 1, further comprising:
an operating element configured adjust the setpoint traveling speed or the setpoint rotational speed proportional to the setpoint traveling speed.

3. The hydrostatic transmission according to claim 1, wherein the P closed-loop controller is a PI closed-loop controller.

4. The hydrostatic transmission according to claim 1, wherein the P closed-loop controller is a PID closed-loop controller.

5. The hydrostatic transmission according to claim 1, further comprising:
a first pressure-limiting valve arranged on a first working line of the two working lines; and
a second pressure-limiting valve arranged on a second working line of the two working lines,
wherein the braking operation is a high-power braking operation in which a first part of the braking power is dissipated via one of the first and the second pressure-limiting valves, while a second part of the braking power is dissipated via the primary unit.

6. The hydrostatic transmission according to claim 5, wherein the first and second pressure-limiting valves each have a flat characteristic curve with regard to their pressure difference as a function of their passed-through volume flow.

7. The hydrostatic transmission according to Claim 1, wherein the first value proportional to the first additional braking torque is a first additional swept volume of the at least one secondary unit.

8. The hydrostatic transmission according to claim 7, wherein the first additional swept volume is added to a minimum swept volume, giving a required total swept volume of the at least one secondary unit.

9. The hydrostatic transmission according to claim 1, wherein the pivot angle and the swept volume of the primary unit are adjustable in both directions from a central position or from a zero position.

10. A hydrostatic transmission for a traction drive, comprising:
a primary unit coupled to an internal combustion engine of the traction drive;
at least one secondary unit coupled to an output of the traction drive;
two working lines of a closed circuit configured to fluidically connect the primary unit and the at least one secondary unit;
an electrical control unit, wherein each of the primary unit and the at least one secondary unit have an adjustable pivot angle or an adjustable swept volume which are controllable by the electrical control unit during a braking operation of the hydrostatic transmission;
a P closed-loop controller configured for closed-loop control of a required total braking torque or of a value proportional to the required total braking torque; and
a D closed-loop controller,
wherein an input variable of the P closed-loop controller is (i) a traveling speed difference between a setpoint traveling speed and an actual traveling speed, or (ii) a rotational speed difference, proportional to the traveling speed difference, between a setpoint rotational speed and an actual rotational speed of the at least one secondary unit, and
wherein an input variable of the D closed-loop controller is the setpoint traveling speed or the setpoint rotational speed proportional to the setpoint traveling speed.

11. The hydrostatic transmission according to claim 10, wherein an output variable of the D closed-loop controller is a second additional braking torque of the at least one secondary unit or a second value, proportional to the second additional braking torque, of the secondary unit.

12. The hydrostatic transmission according to claim 11, wherein the second value proportional to the second additional braking torque is a second additional swept volume of the secondary unit.

13. A method for closed-loop control of a required total braking torque or a required total swept volume, proportional to the required total braking torque, of a hydrostatic transmission for a traction drive, the method comprising:
calculating a first additional swept volume with a P closed-loop controller based on a traveling speed difference or a rotational speed difference proportional to the traveling speed difference;

adding the first additional swept volume to a minimum swept volume to give the required total swept volume of at least one secondary unit; and setting a swept volume of at least one secondary unit to the required total swept volume, wherein the hydrostatic transmission includes
- a primary unit coupled to an internal combustion engine of the traction drive,
- the at least one secondary unit coupled to an output of the traction drive,
- two working lines of a closed circuit configured to fluidically connect the primary unit and the at least one secondary unit,
- an electrical control unit, wherein each of the primary unit and the at least one secondary unit have an adjustable pivot angle or an adjustable swept volume which are controllable by the electrical control unit during a braking operation of the hydrostatic transmission, and
- the P closed-loop controller, wherein the P closed-loop controller is configured for closed-loop control of the required total braking torque or of a value proportional to the required total braking torque, and wherein an input variable of the P closed-loop controller is (i) the traveling speed difference between a setpoint traveling speed and an actual traveling speed, or (ii) the rotational speed difference, proportional to the traveling speed difference, between a setpoint rotational speed and an actual rotational speed of the at least one secondary unit.

14. The method according to claim 13, further comprising:

calculating a second additional swept volume with a D closed-loop controller based on the setpoint traveling speed or the setpoint rotational speed proportional to the setpoint traveling speed, wherein in adding the first additional swept volume, the second additional swept volume is jointly also added to the minimum swept volume of the at least one secondary unit.

* * * * *